July 25, 1933.  S. S. GREEN  1,920,029
CIRCUIT CONTROLLER
Filed May 6, 1931  6 Sheets-Sheet 1

INVENTOR
Stanley S. Green.
By Wilkinson, Huxley, Byron & Knight ATTORNEYS.

July 25, 1933.  S. S. GREEN  1,920,029
CIRCUIT CONTROLLER
Filed May 6, 1931   6 Sheets-Sheet 2

Stanley S. Green. INVENTOR
By Wilkinson, Huxley, Byron + Knight ATTORNEYS.

Stanley S. Green.
INVENTOR

By Wilkinson, Huxley, Byron & Knight ATTORNEYS.

Patented July 25, 1933

1,920,029

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

CIRCUIT CONTROLLER

Application filed May 6, 1931. Serial No. 535,401.

My invention relates to controllers for electric circuits of the type disclosed in my copending application Serial No. 285,114, filed June 13, 1928, (Patent Number 1,897,118) and in said application the general structure disclosed in this present application is claimed in its broadest aspects. In my said copending application, I have disclosed an electric circuit controller which may be used, for example, in the place of a common circuit breaker or fuse and switch. It includes a body of electric current-conducting liquid, such as mercury, that is normally contained in the bore or passage of a conduit or control tube made of insulating material. This current-conducting liquid serves to electrically connect two electrodes of the associated circuit, when the device is in circuit closing position. When there is an abnormal flow of current through the device, the mercury in the bore vaporizes; the vapor expels the mercury from the conduit or expels a sufficient portion of it to break the electrical connection between the electrodes, and thereby open the circuit. By rotating the switch, the mercury may be again gathered in the conduit to again close the circuit.

According to the present invention (i. e. the invention covered by the present application) such a switch is provided with a control tube of more durable and dependable construction, and is used with a new type of mounting in which one terminal is pivoted to a fixed connector-support and the other terminal is secured to a separated conductor-support pivoted about a point in the pivotal axis of the first conductor. The controller also includes various other improvements constituting a part of this invention.

This application is in part a continuation of my copending applications Serial Nos. 446,566, filed April 23, 1930; 455,679, filed May 26, 1930; 463,174, filed June 23, 1930; 469,333, filed July 21, 1930; and 511,382, filed January 26, 1931, in addition to the above mentioned application. In each of these some aspect of the invention herein disclosed or some modification thereof is broadly claimed.

Numerous objects are accomplished by this invention. A control tube assembly is provided which remains substantially accurate through long usage and which is able to withstand the explosive force of severe overloads. A mounting is provided which allows the circuit controller units to be readily pivoted between off and on positions and which at the same time constitutes the electrical connections for the controller units. At the same time, this mounting is reduced to extreme simplicity, having few parts, so that the manufacturing costs are extremely low. The mounting is so constructed that one of its terminals may be moved to various positions for the sake of convenience in connection.

Other objects are accomplished which tend to permit economical manufacture through standardization. For example, the housing is such that it may be made standard for a wide range of commercial applications. The control tube may be varied as may the name plate. By using the handle for holding the name plate in position, by providing a notched rim for protecting the name plate and for holding it and the handle against turning with respect to the unit, both standardization and simplicity are secured. If the controller is mounted in a metal box, the cover of the box may be provided with an opening just large enough to receive the rim, thus leaving the name plate and handle exposed, and at the same time fitting more closely to the controller than would be uniformly possible without the rim. The name plate may be printed with suitable data, and may include all the information of a temporary nature. The handle is so mounted that it may be replaced by a gear which would be held in place and restrained in relative rotation in the same manner as was the handle. By means of this gear any number of controllers may be operated in unison.

Another object of this invention is the provision of a cheaply constructed control tube which will be satisfactory for the purpose of this invention. In fact, the entire controller has been simplified and improved in various details. Especially it should be noted that means have been provided for joining the parts of and sealing and housing both simply and permanently.

With these and various other objects in view, the invention may consist of certain novel features of construction and operation, as will be more fully described and particularly pointed out in the specification, drawings and claims appended hereto.

In the drawings, which illustrate an embodiment of the invention, and wherein like reference characters are used to designate like parts.

In the forms of the invention illustrated, the casing is moulded of insulating material and includes the cup shaped front half 1 and the separable cup shaped rear half 2. These casing sections 1 and 2 telescope together and are clamped in place by the metallic band 3 which is forced over them and crimped or spun in place. A film of cement, such as bakelite varnish, is desirably applied to the telescoping surfaces before placing them together.

The circuit-controlling elements are within the casing which is operable to "on" and "off" positions. These circuit controlling elements include as shown in the embodiment of the invention illustrated, a control tube 4, preferably of porcelain produced by the wet process. This tube is surrounded by a reinforcing metal jacket 5 which is preferably of iron and is initially of smaller internal size than the portion of the control tube it surrounds. Jacket 5 is preferably formed from sheet metal as by drawing and then pressed into position over tube 4.

Upon heavy short circuits an explosive effect takes place within the tube 4. In a nominal one hundred and fifteen volt circuit having a capacity sufficient to supply in the neighborhood of five thousand amperes, the vaporization of the liquid within the bore is completed within a very small fraction of a second. Expansion of this liquid into vapor is so sudden and complete as to cause an explosion which is not only powerful but shattering. The preferred materials for tube 4 being vitreous or brittle in nature are in themselves usually incapable of repeatedly standing great explosive force and for successful often repeated operations require reinforcement by a strong and non-brittle substance. The metal jacket 5 provides this reinforcement. The use of a metal jacket which is undersize as mentioned in the preceding paragraph, obviously results in its being in a state of elastic expansion when it surrounds the control tube. Whereas a jacket which was merely snug might let the control tube be cracked by an explosion, a jacket which is under elastic expansion will either prevent such cracks or hold the pieces under such compression that the cracks will be harmless.

The liquid filled conduit bore of the control tube must reliably carry all current up to and including the predetermined rated current corresponding to the predetermined size of this bore. Above this value, vaporization of the liquid conductor occurs causing ultimate expulsion of liquid conductor from the bore and automatic interruption of the circuit. With currents approaching the rated current, the liquid conductor and the refractory tube are heated to a temperature approaching but falling short of the boiling temperature of the mercury or other liquid conductor used. The highly porous ceramic materials may give off some of their occluded gases or impurities in gaseous forms. Bubbles of these impurities may displace the liquid conductor in the conduit bore to an extent that would break the circuit but prematurely and erratically. Non-porous materials are free of this difficulty. Wet process porcelain is a non-porous material. In its production the clay composition is mixed with sufficient water to form a homogeneous plaster or dough-like mass which may be poured, moulded or extruded with the application of little mechanical force or pressure.

Figure 3:
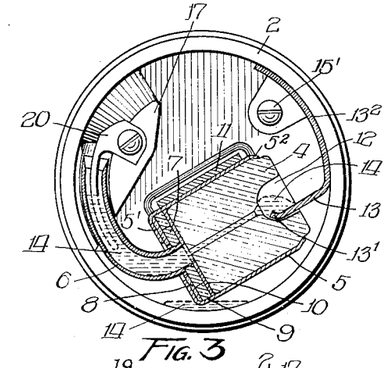
Figure 3 is a front vertical sectional view of the circuit controller, in the "on" position, the front section of such housing and the mounting being omitted.
Figure 7:
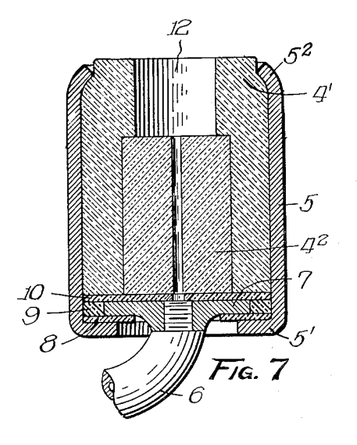
Figure 7 shows in cross section a modified construction of control tube for the circuit controller.

Figure 7 illustrates an alternate construction in which the costly wet-process porcelain is not needed. The outer portion of the control tube 4' may be moulded of any convenient type of insulating material, preferably dry-process porcelain which is reasonable in cost. The interior core 4² is of glass tubing with a small bore and is slipped into the more or less porous dry-process porcelain exterior tube and if desired is cemented therein. The dry process porcelain tube together with the glass tube therein comprise when finished a substantially integral assembly that takes the place of and accomplishes the same purpose as the single piece wet-process porcelain core illustrated in the construction of Figure 3. An object in using the glass core in the dry-process porcelain is to secure a non-porous control tube bore for the reasons discussed above. Another reason for using the glass core is that suitable glass tubing is very low in cost and can readily be cut or broken into proper lengths and the proper size holes secured in such tubing with great precision by suitably gauging the holes in the resultant pieces and rejecting those outside of the desired limits of accuracy. The use of glass alone is impractical at the present time because of breakage and because of forming difficulties. Of course any non-porous material may be used if otherwise suitable.

A feed tube 6, preferably of metal, communicates with one end of the bore of tube 4. At the end adjacent tube 4, one end of this feed tube is fastened, as by threads to a disk 7. Disk 7 is electrically insulated from jacket 5 by means of insulating washers 8, 9 and 10, preferably formed of a heat resisting insulation such as asbestos paper or asbestos pressboard. Such insulating washers may be impregnated with a heat resisting compound or binder if desired. Disk 7 and its insulating washers 8, 9 and 10 are positioned in the bottom of jacket 5 and tube 4 is forced into the jacket. At its end adjacent the tube 6, the jacket 5 has a flange 5'. When tube 4 is forced into the jacket, disk 7 together with its insulating washers is held tightly between such flange 5' and tube 4. A second flange 5² on the normally upper part of jacket 5 is then bent over a shoulder near the end of tube 4. Feed tube 6, control tube 4, and jacket 5 are in this way made as one unitary assembly. The mercury can be fed to control tube 4 through feed tube 6.

On the outside of jacket 5 is fastened securely, as by spot-welding, a transverse metal support piece 11. The ends of this piece nest snugly into recesses 11' and 11² provided therefor in the respective front and rear casing halves. This support positions the current-controlling unit comprising tube 4 securely and accurately in the housing independent of any other means for support. The heat and arcing attendant to operation are localized within tube 4 and spaced a substantial distance from the walls of the container by this construction. The support is so located as to be out of the path of the mercury, thereby avoiding contamination.

The end of the bore of the control tube 4 remote from the tube 6 is enlarged to form a well 12 adapted to receive the tip 13' of a metallic electrode 13 which contacts with the mercury 14, or other liquid conductor contained in the conduit bore, and the well enlargement 12 when the device is in circuit closing position. Slight clearance desirably intervenes between the wall of well 12 and the electrode part 13'. Electrode 13 is fastened in position upon a metallic lead-in stud 15 by a screw 15' threading into the inner end of this stud. A boss 16 constituting a part of casing section 2 is securely moulded about the knurled end of stud 15 which passes through to the exterior of the casing. The curved end 13' of the metallic electrode 13 has sufficiently full contact with the mercury in the well 12 without substantially obstructing the free passage of the mercury and mercury vapor which may be explosively discharged from the control tube bore upon severe short circuit. A portion of the electrode 13 is formed to constitute a barrier 13² to protect the casing wall from the explosive effects of the hot mercury or liquid conductor and the vapor thereof that are ejected violently from the control tube bore upon short circuit. This liquid conductor vapor and the attendant arc of high temperature might otherwise strike the casing wall forcibly with injurious effect.

The metals exposed in the container to the action of mercury or mercury vapor may be made of non-ferrous metal such as copper, if that metal is coated with iron, nickel, or other mercury resistant metal.

Mating projections 17 and 18 are respectively integrally moulded with the casing sections 1 and 2, and form with contiguous portions of the casing a funnel-shaped space 19. The receiving end of the feed tube 6 farthest from control tube 4 may be freely received within the stem of the funnel to virtually constitute a continuation thereof. A considerable degree of clearance between the stem of feed tube 6 and the lower end or stem of funnel 19 though not necessary, is desirable in order to provide a tolerance which in manufacture will insure both halves of the casing going together without being prevented by the end of feed tube 6 in the stem of the funnel 19. I have found a clearance on all sides of the feed tube of approximately .010″ satisfactory for this purpose.

Another electrode 20 is provided to dip into the liquid conductor in the feed tube and thus make electrical connection through the liquid conductor in the feed tube and the bore of control tube 4 with the electrode 13. Such electrode 20 is conveniently punched from sheet metal and is supported upon another lead-in stud 21 by means of a screw 21′ threading into the interior end of this stud. Lead-in stud 21 is knurled and is cast into and passes through the casing half 2 in the same manner as its companion lead-in stud 15. It conveniently passes through the housing at mating projection 17 which therefore acts as the boss. The bore of feed tube 6 is made large enough to admit electrode 20 with clearance all around it to allow for free passage of the mercury into and out of the tube.

Figure 4:
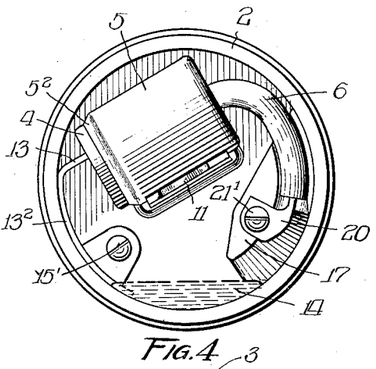
Figure 4 is a view, somewhat similar to Figure 3, but showing the controller casing in its "off" position and illustrating parts in elevation that appear in section in Figure 3.
Figure 5:
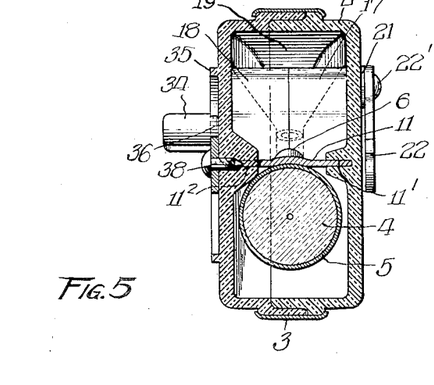
Figure 5 is a section on the line 5—5 of Figure 1 of the circuit controller without the mounting.
Figure 6:
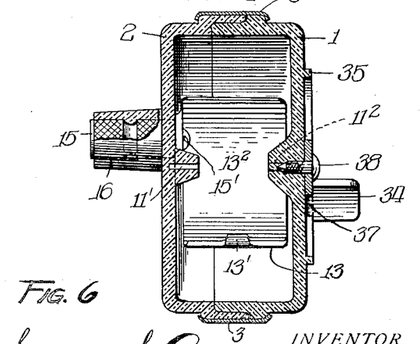
Figure 6 is a section on the line 6—6 of Figure 1 showing the circuit controller casing and one electrode only.

Control tube 4 and feed tube 6 are so positioned with respect to the casing that when the device is turned from "on" to "off" positions, the mercury will flow by gravity therefrom to the then bottom of the casing, as indicated at 14 in Figure 4, thus opening the circuit. As the device is turned from "off" to "on" position, the mercury will be gathered by funnel 19 and will flow by gravity through the cup and stem of the funnel into the feed tube 6, and thence to the bore of the control tube 4 and well 12, whereby the circuit is closed as the mercury makes contact with both electrodes. In the event the liquid conductor vaporizes while the controller is "on" with resulting interruption of the circuit, it is only necessary to operate the controller successively to "off" and "on" positions when the liquid conductor will be returned to the tube 6 and control tube 4 and the circuit reestablished without the renewal of any parts. To insure closure of the circuit, I provide an excess of mercury or liquid conductor which finds lodgment in the then bottom of the casing as indicated at 14 in Figure 3, this excess flowing from the well 12 when the device has been fully brought to its "on" or circuit closing position. A controller unit, such as that described above, is preferably mounted on a device which not only pivotally supports it but which also provides the electrical connections to the lead in studs 15 and 21.

A front radial connector 22 is fastened securely to the outer end of electrode stud 21 as by a screw 22′. Radial connector 22 is fastened to a front support-conductor or terminal strap 24 as by a screw 24′ in such a manner that a swivel bearing is obtained between such connector 22 and support terminal 24. Similarly a rear radial connector 23 is fastened securely to the outer end of electrode stud 15 as by a screw 23′. Radial connector 23 is fastened to a rear support-conductor or terminal strap 25 as by a screw 25′ in such a manner that a swivel bearing is obtained between such connector 23 and support terminal 25.

Figure 9:
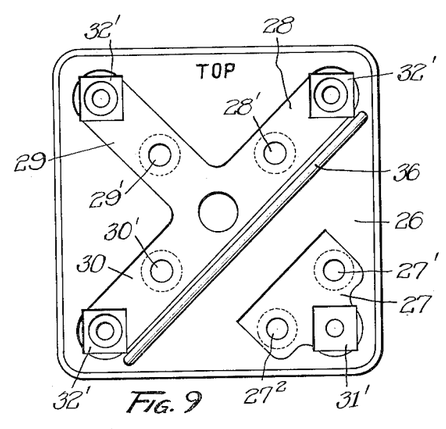
Figure 9 is a plan view of the circuit controller base.

A base 26 of suitable material such as porcelain, receives the terminal straps 24 and 25. Such a base with these straps removed is shown in Figure 9. A recess 27 is provided to receive front terminal strap 24 and two holes 27′ and 27² are provided in the base to match with corresponding holes in said terminal strap so that it can be held on the base.

Similarly recesses 28, 29 and 30 are provided in the porcelain base to receive the rear terminal strap 25 and are so shaped that terminal strap 25 can be applied to and permanently fastened in any one of them. Holes 28′, 29′ and 30′ are provided in the base to match with the corresponding hole in said terminal strap so that it can be held on the base. Depending upon the type of service to which the device is to be put, it is of considerable advantage to have rear terminal strap 25 in one or the other of the three possible positions. Binding screws 31 and 32 fastening into nuts held in recesses 31′ and 32′ in the porcelain base enable the wires from the control circuit to be fastened to the respective terminal straps.

Current is conducted through the respective sliding contacts between terminal straps and radial connectors at the respective swivel joints. With the construction described, the radial connectors and terminal straps securely support the circuit controller housing on the base 26 and yet allow it to be readily pivotable to either its "on" or "off" position. Tension or spring washers (not shown) may be provided at the swivel joints.

The pivotably slidable mounting which has been described is an improvement on such a mounting modeled on the same general principles disclosed in my copending application Serial No. 511,382.

Figure 8:
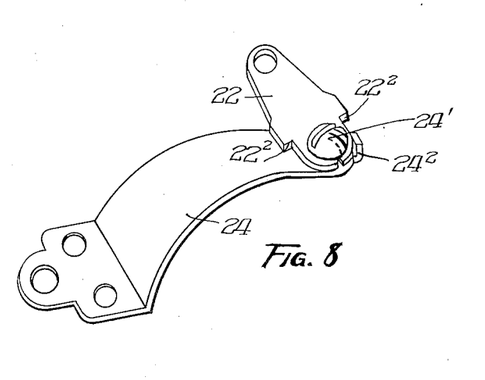
Figure 8 is a detailed view in perspective of one pair of pivotal-contact connectors by which the circuit controller casing is supported and connected in circuit.
Figure 10:
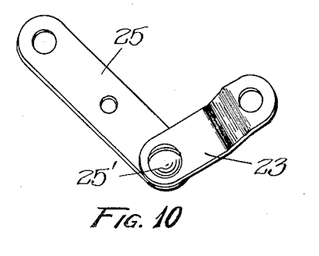
Figure 10 is a detailed view in perspective of a second pair of pivotal-contact connectors by which the circuit controller casing is supported and connected in circuit.

The casing may be moved through approximately 180 degrees to its "on" and "off" position and in so doing pivotally sliding electrical contact is maintained between radial connector 22 and support-terminal strap 24 in one case and between radial connector 23 and support-terminal strap 25 in another case. Stops 22² and 24² are provided on connecting straps 22 and 24 to limit the range of motion of the device. This construction is clearly disclosed in Figure 8, which shows in detail one pair of supplementary pivotally sliding connectors, namely, front radial connector 22 and front terminal strap 24. Similarly, Figure 10 shows in detail rear radial connector 23 and rear terminal strap 25. The base 26 is preferably provided with a shoulder 36 as a further safeguard against rotating the housing too far.

The swivel mounting construction shown spaces the lead-in conductors a proper distance apart, allows suitable sliding contact while the housing is being turned from one position to another, and also supports the housing effectively and simply.

Figures 15, 16, 17:
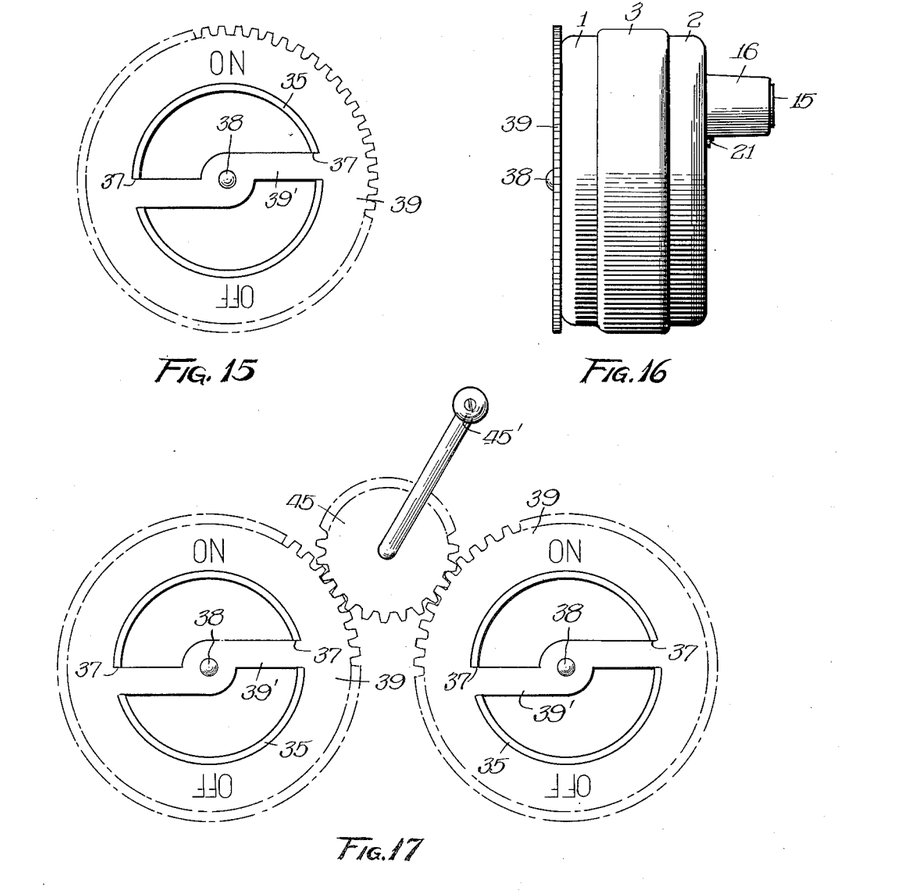
Figure 15 is a plan view of a modified form of circuit controller housing having a member for linking it in common operation with other similar circuit controllers.
Figure 16 is a side view of the housing of Figure 15.
Figure 17 illustrates schematically two such controllers linked together with a gear.

It is commercially desirable to produce the housing in a large multiple-cavity mould and to have one such type of housing suffice for a large range of current-carrying capacities as well as more than one type of application and use. To make multiple-cavity low cost moulding feasible, it is necessary to provide a design of housing which is unencumbered with nameplate data or minor modifications. Thus, although it is desirable to mould the words "off" and "on" in the housing for economy, and because the words are applicable to any type or size of circuit controller, it is necessary to eliminate from the housing moulds all other wording or data of a changeable character. I do this by providing a name-plate 33 which may be printed separately from the moulding operation in any required style or rating. It is desirably printed on a good quality of paper card, although thin metal may be used. It is held in place by operating handle 34 which is preferably formed from sheet metal. A rim 35 is cast on the housing to protect the edge of nameplate 33 and also to provide a means to prevent the nameplate 33 or handle 34 from turning on the housing. For this latter function, notches 37 are formed in the rim and engage with lugs on the nameplate and with ends of the handle. Handle 34 is held in place on the face of the housing by screw 38. If desired a gear wheel 39 having a pair of spokes 39' may be substituted in some models for the operating key as shown in Figure 16.

It is evident that the complete assembly of base, carrier and circuit controller constitutes a complete circuit breaker device capable of switching the controlled circuit on and off and in addition having a predetermined current-carrying capacity beyond which the circuit is automatically opened, the device being so constructed that the circuit may be reclosed manually without the renewal of any of its parts. Such a circuit breaker device can be used in many ways and if desired can be mounted in the ordinary type of metal switch box so that all wires to and from it can be completely enclosed and metal-clad. Thus, in my copending application Serial No. 463,174, a liquid conductor circuit controller somewhat similar to the present described controller but with a different form of mounting, is described in use with a metal box or cabinet to form a meter entrance switch. As an example of how the present switch and method of mounting can be applied to applications where a box or cabinet is employed, reference is made to Figure 11, which shows an enclosing box or housing 40 having a cover 41. Within this box is mounted the circuit controller herein disclosed. A hole 41' is cut in the cover of the box through which the rim 35 and the operating handle 34 may extend and be accessible to grasp manually and turn to the "on" and "off" positions. The words "on" and "off" on the circuit controller housing are rendered visible through a slot 41² in the cover. The interfitting of rim 35 and hole 41' makes impossible the insertion of wires through the hole.

Figure 11:
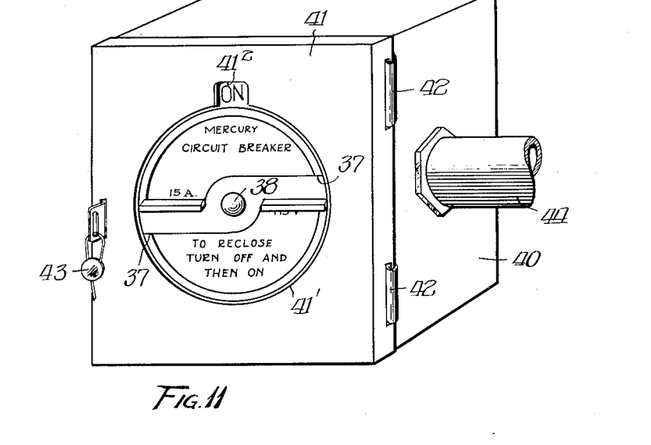
Figure 11 is a perspective view of one of the circuit controllers mounted in a cabinet.

The cover 41 of the box 40 may be hinged as at 42 and be provided with a seal assembly 43 by which unauthorized persons may be kept from undetectably having access to the box. A conduit 44 is shown fastened to one side of box 40 through which one or more wires for connection to the circuit controller may pass.

Figure 12:
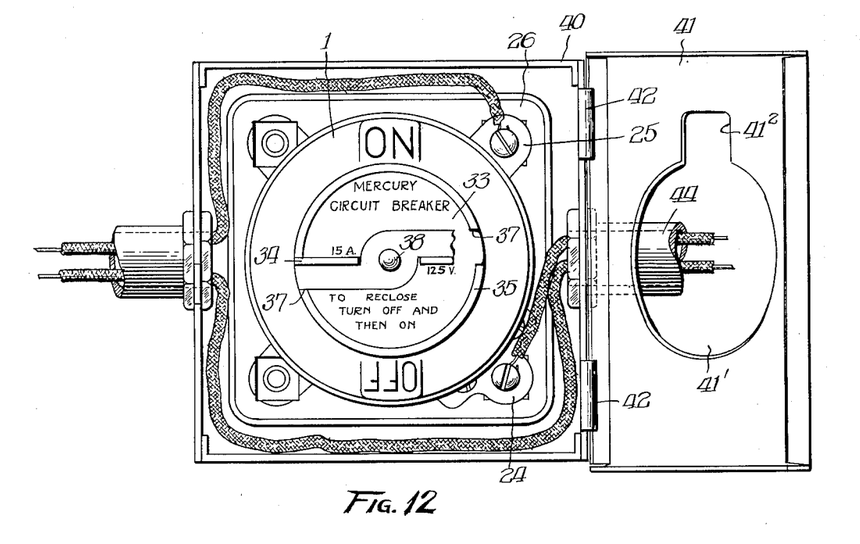
Figure 12 is a plan view of the circuit controller as in Figure 11, but with the lid of the cabinet open to show the interior.
Figure 13:
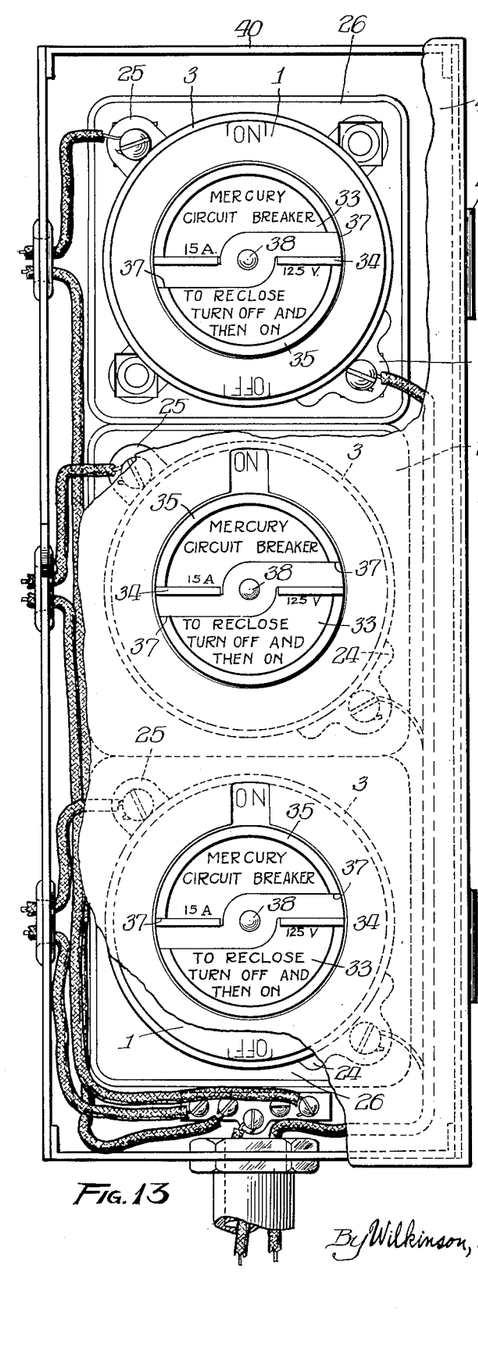
Figure 13 is a plan view of an assembly of circuit controllers used as a distribution panel.
Figure 14:
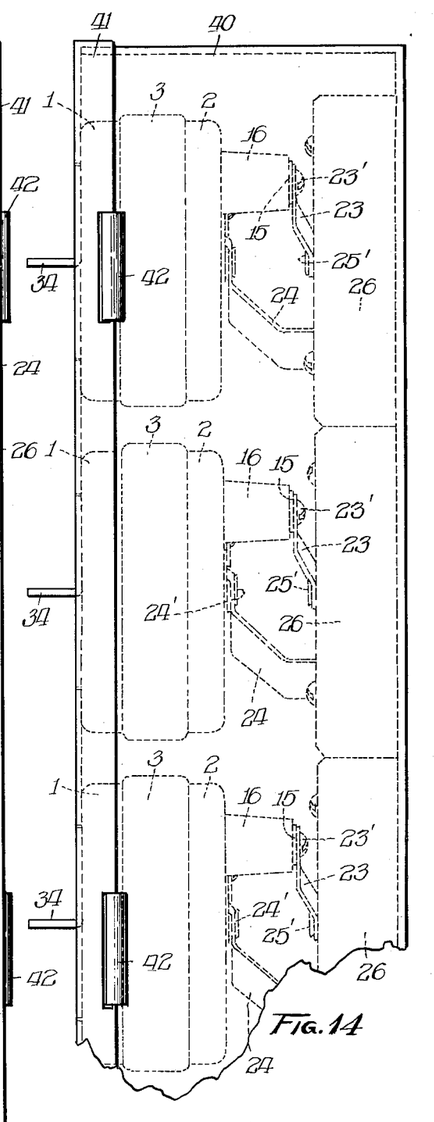
Figure 14 is a side view of the same assembly of circuit controllers.

Figures 13 and 14 show a plurality of circuit controllers used to supply a number of circuits in a well known manner. It should be noted that in Figure 13 the respective rear terminal straps 25 of the controllers are taken off the base in a different position than that shown for the single controller in Figure 12. This adaptability in position of one terminal strap is of value in applying the controller to various types of circuit.

In many applications, as on polyphase circuits having a number of circuit wires and necessitating a circuit controller in more than one of such wires, it is desirable to provide for the common and simultaneous operation of more than one such circuit controller.

Heretofore, especially with liquid conductor switches, this has been done by mounting the controllers on a common shaft or movable member, which construction has not lent itself to a standard unit design of controller and mounting for the same that can be produced in large scale manufacture.

Figure 18:
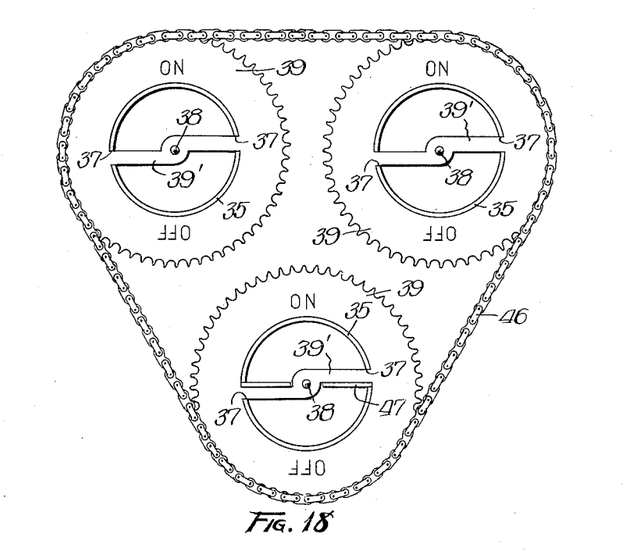
Figure 18 illustrates schematically three circuit controllers linked together with a chain.

Without changing the housing or fundamental mounting of my circuit controller, I am able, on certain types of controllers to be used for such group operation, to supply a gear member 39, previously mentioned, to take the place of the ordinary operating handle 34. In Figures 15, 17 and 18 the words "on" and "off" are shown stamped on such gear members, although this is unnecessary and instead holes can be provided in them at the proper points through which the original words as mounted on the housing can be seen.

With the mounting already described and the additional gear member 39 applicable to any standard circuit controller, an unlimited scope of combinations for mutual simultaneous operation is provided.

In schematic form only, Figure 17 shows two controllers geared together by a pinion 45. A handle 45′ is, in this case, fastened on the pinion shaft. Such an arrangement would be adaptable, for example, to the control of the two outer wires of a single phase, three wire, solid neutral circuit.

In Figure 18, schematically, three controllers are represented as being linked together by a chain 46, one of the gear members being provided with a handle 47.

Figure 1:
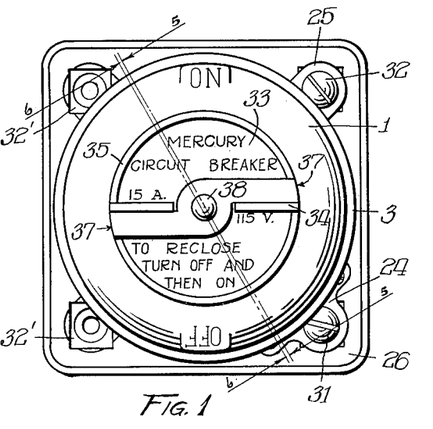
Figure 1 is a front elevation of a circuit controller inclusive of its mountings and base in the "normal on" position.
Figure 2:
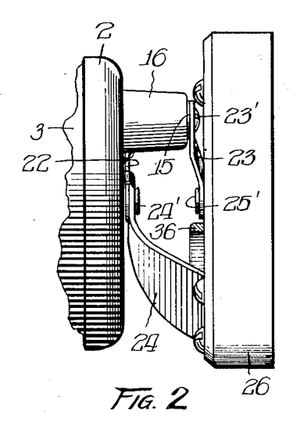
Figure 2 is a fragmentary side elevation of the circuit controller as shown in Figure 1.
Figure 19:
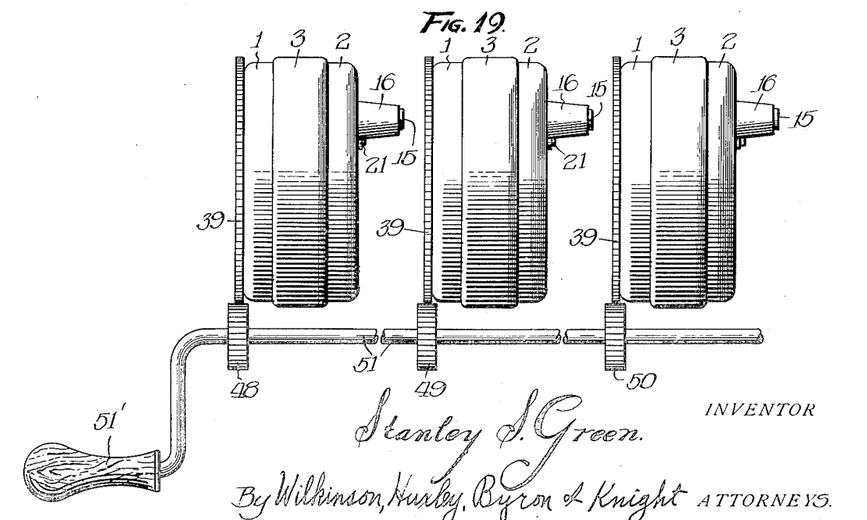
Figure 19 shows schematically a further modification in which three circuit controllers are interlocked with a shaft and gears for common operation.

In Figure 19, schematically, three controllers are represented as being coupled together by pinions 48, 49 and 50, all on a common shaft 51 provided with a handle 51′. It is of course understood that for each controller a support such as that shown in Figures 1 and 2 would be used. The combinations of controllers as represented in Figures 18 and 19 could conveniently be used for the control of a polyphase circuit having at least three wires.

It is evident that if desired teeth such as are on member 39 could be provided directly on the circuit controller housing, as by casting them in said housing, but that a marked advantage from the point of view of standardization of the circuit controllers is obtained by using a separate gear member 39, fastened to the controller. Also a belt could be used without providing teeth on the housing.

If desired, an indicator lamp socket may be provided in the base and connected to the load side of the controller through a resistance (so that a small bulb may be used), and together with other indicator sockets may be connected (through a pushbutton) to the common or return wire.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. The combination of a circuit controller including a casing, a control tube therein, and means for filling said control tube with a liquid conductor upon rotating said casing through over ninety degrees and a mounting therefor including a base, a conductor-support rigidly secured thereto, a conductor rigidly connected to said circuit controller and pivotally connected to said conductor-support, a second conductor spaced from said first named conductor-support and conductor, said circuit controller depending upon said conductors for its support, and an insulating shoulder carried by the base and arranged to prevent the rotation of the circuit controller beyond given points and to prevent a contact between the separate conductors.

2. A circuit controller housing adapted to contain liquid conductor and electrodes for controlling the current in said circuit, and a name plate, said housing being cast with a ring of insulating material adapted to receive and protectively surround said name plate.

3. A circuit controller housing adapted to contain liquid conductor and electrodes for controlling the current in said circuit, a name plate, and an operating member, said housing being cast with a ring of material adapted to receive and protectively surround said name plate, said ring being notched to receive portions of said operating member, a support pin anchored in the housing and holding the member in permanent fixed relation with respect to the housing, and said member being adapted to partially cover and to permanently hold said name plate in place.

4. A circuit controller including in combination a rotatable controller casing having formed integral therewith a ring; a name plate inserted within said ring and protected thereby, a handle secured to said casing and prevented from turning with respect thereto by being seated in notches in said ring, said handle securing said name plate in place, and a protective instrument box having a hole therethrough only slightly larger than the said ring, said controller being rotatably mounted with said ring extending at least partially through said hole.

5. A control tube for a current-limiting circuit controller operating on the liquid-conductor principle, comprising a core of non-porous refractory insulating material having an accurate current limiting bore formed therein and a sleeve of insulating material tightly surrounding said core in reinforcing relationship, both said core and said sleeve being made of a material unsuitable for the formation of the entire control tube in one piece.

6. A control tube for a current-limiting circuit controller operating on the liquid-conductor principle, comprising a core of non-porous refractory insulating material having an accurate current limiting bore formed therein and a sleeve of insulating material tightly surrounding said core in reinforcing relationship and projecting therebeyond at one end to form a well, both said core and said sleeve being made of a material unsuitable for the formation of the entire control tube in one piece.

7. A control tube for a current-limiting circuit controller operating on the liquid-conductor principle, comprising an outer porcelain and an interior core of glass tubing.

8. A control tube for a current-limiting circuit controller operating on the liquid-conductor principle, comprising an outer dry-process moulded porcelain core and an interior core of glass tubing, said tubing having a size of bore related to the current-limiting value of the circuit-controller.

9. A control tube assembly for a liquid conductor, current limiting circuit controller, including a non-porous refractory insulating core having an accurate control bore and a surrounding, tight fitting insulating sleeve extending beyond said core at one end and having that end reduced, whereby an annular shoulder is formed near said end; and a reinforcing jacket surrounding said insulating structure and having a flange bent down over said shoulder.

10. A circuit controller including a casing and a pair of lead-in studs moulded therein, said casing carrying an integral boss moulded around each of said studs, one boss and stud extending inwardly from the casing, and the other boss and stud extending outwardly from the casing.

11. A circuit controller including a casing, a partition within and integral with said casing and arranged to form a funnel, and a lead-in stud moulded within said partition.

12. A circuit controller including a housing having a controller therein of a liquid conductor type, and a pair of leads moulded in said housing and a connector secured to each lead, each of said connectors having a pivot opening, and the connectors being so arranged that the pivot openings are in axial alignment.

13. A circuit controller comprising a control unit which in use must be rotated through two definite positions, a base, and a plurality of connectors and supports extending from said base to said unit and constructed to permit rotation of said control unit relative to said base, said base and said connectors being so constructed and arranged that at least one of the connectors may be positioned in any one of a plurality of positions with respect to said base, without affecting the range of rotation of said control unit.

14. A rotatably mounted circuit controller comprising a housing, liquid conductor and electrodes within the housing for controlling the circuit, an insulating base, connecting arms supported on the housing, connecting straps supported on the base, complementary pairs of said arms and straps being spaced apart in a direction along the axis of rotation, each pair of said straps and arms being electrically and mechanically fastened together by a swivel joint and serving both to conduct the controlled current and to support said rotatable housing, one of said straps being adapted to be attached to said base in any one of a plurality of positions without interfering with the rotation of said circuit controller.

15. The combination of a current-limiting circuit controller including a casing, a control tube therein, and means for filling said control tube with a liquid conductor upon rotating said casing through over ninety degrees and a mounting therefor including an insulating base, a rigid fixed conductor secured thereto, a conductor rigidly connected to said circuit controller and pivotally connected to said first named conductor in a manner to pivot about an axis which extends substantially through the center of said controller and of said base said conductors having broad contacting faces substantially perpendicular to said axis, and an additional conductor spaced from said connected conductors.

16. The combination of a current-limiting circuit controller including a casing, a control tube therein, and means for filling said control tube with a liquid conductor upon rotating said casing through over ninety degrees and a mounting therefor including a rigid fixed conductor, a conductor rigidly connected to said circuit controller and pivotally connected to said first named conductor in a manner to pivot about an axis which extends substantially through the center of said controller, said conductors having broad contacting faces substantially perpendicular to said axis, and an additional conductor spaced from said connected conductors.

17. The combination of a current-limiting circuit controller including a casing, a control tube therein, and means for filling said control tube with a liquid conductor upon rotating said casing through over ninety degrees and a mounting therefor including an insulating base, a rigid fixed conductor secured thereto and having one end provided with a hole therethrough, the axis of which extends substantially through the centers of said base and of said controller, a conductor rigidly connected to said circuit controller and pivotally connected to said first named conductor by a pin extending through said hole, said conductors having broad contacting faces substantially perpendicular to said axis, and an additional conductor spaced from said connected conductors.

18. The combination of a circuit controller including a casing, a control tube therein, and means for filling said control tube with a liquid conductor upon rotating said casing through over ninety degrees and a mounting therefor including a base, a first conductor secured thereto, a second conductor rigidly connected to said circuit controller and pivotally connected to said first conductor, an additional conductor spaced from said first and second conductors but rotatable with the controller to approach them, and an insulating shoulder carried by the base and extending between said additional conductors and said first and second conductors to prevent the additional conductor from contacting said other conductors.

19. A circuit controller including in combination a rotatable controller casing having formed integral therewith a ring, a handle extending rigidly from said casing within the periphery of said ring, and a protecting instrument box having a hole therethrough only slightly larger than said ring, said controller being rotatably mounted with said ring extending at least partially through said hole.

20. A current-limiting circuit controller comprising a control unit including an insulating control tube having a bore therethrough, a liquid conductor normally filling said bore, and a pair of electrodes electrically connected by the liquid conductor in said bore, the said bore being formed in a non-porous material and of such caliber that the liquid conductor therewithin will vaporize at a predetermined current load, said control unit having sufficient strength to resist without injury the explosive force caused within said bore by a heavy short circuit.

21. A current-limiting circuit controller comprising a control unit including an insulating control tube having a bore therethrough, a liquid conductor normally filling said bore, and a pair of electrodes electrically connected by the liquid conductor in said bore, the said bore being formed in a nonporous material and of such caliber that the liquid conductor therewithin will vaporize at a predetermined current load, said control unit having sufficient strength and heat resisting qualities to resist without injury the explosive force and heat caused within said bore by a heavy short circuit.

22. A current-limiting circuit controller comprising a control unit including an insulating control tube having a bore therethrough, a liquid conductor normally filling said bore, and a pair of electrodes electrically connected by the liquid conductor in said bore, the said bore being formed in a non-porous material and of such caliber that the liquid conductor therewithin will vaporize at a predetermined current load, said control tube having sufficient heat resisting properties to withstand without injury the heat produced suddenly in said bore by a severe short circuit.

23. A current-limiting circuit controller comprising a control unit including an insulating control tube having a bore therethrough, a liquid conductor normally filling said bore, and a pair of electrodes electrically connected by the liquid conductor in said bore, the said bore being formed in a non-porous material and of such caliber that the liquid conductor therewithin will vaporize at a predetermined current load, said control unit having sufficient strength to resist without injury the explosive force caused within said bore by a heavy short circuit, and said control tube having an enlarged well communicating with said bore.

24. A current-limiting circuit controller comprising a control unit including an insulating control tube having a bore therethrough, a liquid conductor normally filling said bore, and a pair of electrodes electrically connected by the liquid conductor in said bore, the said bore being formed in a wet process porcelain and of such caliber that the liquid conductor therewithin will vaporize at a predetermined current load.

25. A current-limiting circuit controller comprising a closed casing forming an expansion chamber, an insulated control tube having a bore therethrough communicating with said chamber through its end, a liquid conductor normally filling said bore, a pair of electrodes electrically connected by such conductor in said bore, said bore being of such caliber that the liquid conductor therein will vaporize at a predetermined current load, said tube having at one end an enlarged well through which the bore communicates with the chamber and which receives an electrode, and a metallic reinforcing jacket surrounding and tightly and rigidly enclosing the tube substantially throughout the length of said bore but leaving the said end bare of a conducting jacket.

26. A current-limiting circuit controller comprising a control unit including an insulating control tube having a bore therethrough, a liquid conductor normally filling said bore, a pair of electrodes electrically connected by the liquid conductor in said bore, the said bore being formed in a non-porous material and of such caliber that the liquid conductor therewithin will vaporize at a predetermined current load, and a metallic reinforcing jacket surrounding and tightly and rigidly enclosing the control tube in the zone of the bore.

27. A current-limiting circuit controller comprising a control unit including an insulating control tube having a bore therethrough, a liquid conductor normally filling said bore, a pair of electrodes electrically connected by the liquid conductor in said bore, the said bore being of such caliber that the liquid conductor therewithin will vaporize at a predetermined current load, a sealed casing enclosing said control unit and providing a large expansion chamber communicating with the bore therein, and a support for said control unit carried by said casing and holding the control tube in spaced relation to the casing.

28. A current-limiting circuit controller comprising a control unit including an insulating control tube having a bore therethrough, a liquid conductor normally filling said bore, a pair of electrodes electrically connected by the liquid conductor in said bore, the said bore being of such caliber that the liquid conductor therewithin will vaporize at a predetermined current load, a sealed casing enclosing said control unit and providing a large expansion chamber communicating with the bore therein, and a metal support for said control unit carried by said casing and holding the control tube in spaced relation to the casing, said support being in a position inaccessible to the liquid conductor in normal use.

29. An overload-protective circuit controller comprising a casing movable to off and on positions and containing an expansion chamber, liquid conductor within the casing, an insulating control tube having a current-limiting bore communicating at each end with the expansion chamber, said bore being of such a size that liquid conductor therein will vaporize above a predetermined current load, an electrode at one end of said control tube extending into an enlarged portion of the current-limiting bore and a metal member at the other end of said control tube, said metal member having a hole therein communicating with said current-limiting bore and with said expansion chamber for the passage of liquid conductor therethrough.

30. An overload-protective circuit controller comprising a casing movable to off and on positions and containing an expansion chamber, liquid conductor within the casing, an insulating control tube having a current-limiting bore communicating at each end with the expansion chamber, said current-limiting bore being of such size that current-carrying liquid conductor contained therein will vaporize above a predetermined current load, a metal band which passes around a portion of the outside of said control tube to give it strength, an electrode at one end of said control tube exposed to make contact with liquid conductor contained in said current-limiting bore, and a feed-tube arranged for the passage of liquid conductor therethrough, said feed-tube connecting one end of said current-limiting bore with the expansion chamber.

31. A current-limiting circuit controller including a control tube unit having a control tube which has a bore therethrough, a liquid conductor normally filling said bore, and a pair of electrodes electrically connected by the liquid conductor in said bore, the walls forming said bore consisting of an insulating material which is substantially impenetrable by mercury or mercury vapor, and said unit having sufficient strength and heat resisting properties to withstand the explosive force and heat of a severe overload.

32. A current-limiting circuit controller including a control tube unit having a control tube which has a bore therethrough, a liquid conductor normally filling said bore, and a pair of electrodes electrically connected by the liquid conductor in said bore, the walls forming said bore consisting of an insulating material the insulating character of which is not materially decreased by long association with mercury and frequent association with mercury vapor under pressure, and said unit having sufficient strength and heat resisting properties to withstand the explosive force and heat of a severe overload.

33. A current-limiting circuit controller including a control tube unit having a control tube which has a bore therethrough, a liquid conductor normally filling said bore, and a pair of electrodes electrically connected by the liquid conductor in said bore, the walls forming said bore consisting of an insulating material the insulating character of which is not materially decreased by long association with mercury and frequent association with mercury vapor under pressure and which does not extrude a gas or vapor into said bore when heated up to the vaporization temperature of mercury, and said unit having sufficient strength and heat resisting properties to withsand the explosive force and heat of a severe overload.

34. An electric circuit controller including a conduit of heat-resisting insulation; a liquid conductor within the bore of such conduit; electrodes connectible by said liquid conductor; and a metal reinforcing means insulated from the electrodes and fastened around a portion of the conduit to retard its breakage upon explosive ejection of the liquid conductor from said tube.

35. An electric circuit controller including a conduit of heat-resisting insulation; a liquid conductor within the conduit bore; electrodes connectible by said liquid conductor; and a metal reinforcing band tightly surrounding the conduit and which is initially of smaller internal size than the portion of the conduit it surrounds and requires to be expanded as by heat in order that it may be applied to the conduit.

36. The process of forming a control tube assembly which comprises expanding a metal reinforcing jacket and inserting in said jacket a comparatively fragile control tube of a size which fits tightly in said jacket while said jacket is still expanded to a substantial extent.

37. An electric circuit controller including a conduit of heat-resisting insulation; a liquid conductor within the conduit bore; electrodes connectible by said liquid conductor; and a metal reinforcing band tightly surrounding the conduit and which is held in a state of elastic expansion by said conduit.

38. A control tube for a current limiting circuit controller operating on the liquid conductor principle, comprising a core of glass having a simple cylindrical shape and having an accurate current-limiting bore formed therein, and a sleeve of insulating material tightly surrounding said core in reinforcing relationship and giving to the assembly a complex shape which would be difficult to form in one piece from glass.

STANLEY S. GREEN.